(12) United States Patent
Li et al.

(10) Patent No.: US 10,051,649 B2
(45) Date of Patent: Aug. 14, 2018

(54) TDD BASED PROSE OPTIMIZATION

(71) Applicant: Telefonaktiebolaget LM Ericsson (publ), Stockholm (SE)

(72) Inventors: Yunxi Li, Järfälla (SE); Xinghua Song, Beijing (CN); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/543,526

(22) PCT Filed: Feb. 25, 2016

(86) PCT No.: PCT/SE2016/050139
§ 371 (c)(1),
(2) Date: Jul. 13, 2017

(87) PCT Pub. No.: WO2016/137383
PCT Pub. Date: Sep. 1, 2016

(65) Prior Publication Data
US 2018/0007702 A1    Jan. 4, 2018

(30) Foreign Application Priority Data
Feb. 26, 2015   (WO) ................ PCT/CN2015/073314

(51) Int. Cl.
*H04W 72/12*   (2009.01)
*H04W 4/00*    (2018.01)
*H04W 76/04*   (2009.01)
*H04W 4/70*    (2018.01)
*H04W 76/27*   (2018.01)

(52) U.S. Cl.
CPC ....... *H04W 72/1205* (2013.01); *H04W 4/005* (2013.01); *H04W 4/70* (2018.02); *H04W 76/046* (2013.01); *H04W 76/27* (2018.02)

(58) Field of Classification Search
CPC ........... H04W 4/00–4/02; H04W 4/70; H04W 72/1205; H04W 76/27
See application file for complete search history.

(56) References Cited

U.S. PATENT DOCUMENTS

2015/0208421 A1*  7/2015  Agiwal ............. H04W 36/0072
                                                        455/436
2016/0044619 A1*  2/2016  Ryu .................. H04W 56/0015
                                                        370/350

OTHER PUBLICATIONS

Catt, "R1-135092: Discussion on physical channel types for D2D communication," 3rd Generation Partnership Project (3GPP), TSG RAN WG1 Meeting #75, Nov. 11-15, 2013, 4 pages, San Francisco, USA.
Samsung, "R1-142111: Mode 2 resource allocation for D2D broadcast communication," 3rd Generation Partnership Project (3GPP), TSG RAN WG1 Meeting #77, May 19-23, 2014, 6 pages, Seoul, Republic of Korea.

(Continued)

*Primary Examiner* — Raymond Dean
(74) *Attorney, Agent, or Firm* — Sage Patent Group

(57) ABSTRACT

The present disclosure pertains to method for operating a network node of a cellular communication network, the method comprising scheduling, by the network node, a ProSe Focused Frame, PFF frame. The disclosure also pertains to related devices and methods.

12 Claims, 9 Drawing Sheets

(56) References Cited

OTHER PUBLICATIONS

Samsung, "R2-145302: Introduction of Prose," 3rd Generation Partnership Project (3GPP), TSG-RAN2 Meeting #88, Change Request 36.331, Version 12.3.0, Nov. 17-21, 2014, 71 pages, San Francisco, USA.
Sharp, "R1-143209: D2D Grant Design for T-RPT," 3rd Generation Partnership Project (3GPP), TSG RAN WG1 Meeting #78, Aug. 18-22, 2014, 4 pages, Dresden, Germany.
International Search Report and Written Opinion for International Patent Application No. PCT/SE2016/050139, dated Jun. 2, 2016, 8 pages.

* cited by examiner

Fig. 3

| Legacy (Config 2) | | | | | | | | | | |
|---|---|---|---|---|---|---|---|---|---|---|
| | #0 | #1 | #2 | #3 | #4 | #5 | #6 | #7 | #8 | #9 |
| | D | S | U | D | D | D | S | U | D | D |

| PFF (Config 4) | | | | | | | | | | |
|---|---|---|---|---|---|---|---|---|---|---|
| | #0 | #1 | #2 | #3 | #4 | #5 | #6 | #7 | #8 | #9 |
| | D | S | U | U | D | D | D | D | D | D |

1 UL/DL in coverage

| Legacy (Config 2) | | | | | | | | | | |
|---|---|---|---|---|---|---|---|---|---|---|
| | #0 | #1 | #2 | #3 | #4 | #5 | #6 | #7 | #8 | #9 |
| | D | S | U | D | D | D | S | U | D | D |

| Legacy (Config 2) | | | | | | | | | | |
|---|---|---|---|---|---|---|---|---|---|---|
| | #0 | #1 | #2 | #3 | #4 | #5 | #6 | #7 | #8 | #9 |
| | D | S | U | D | D | D | S | U | D | D |

2 UL/DL out of coverage When no MasterInformationBlock-SL

| Legacy (Config 2) | | | | | | | | | | |
|---|---|---|---|---|---|---|---|---|---|---|
| | #0 | #1 | #2 | #3 | #4 | #5 | #6 | #7 | #8 | #9 |
| | D | S | U | D | D | D | S | U | D | D |

| Legacy (Config 2) | | | | | | | | | | |
|---|---|---|---|---|---|---|---|---|---|---|
| | #0 | #1 | #2 | #3 | #4 | #5 | #6 | #7 | #8 | #9 |
| | D | S | U | D | D | D | S | U | D | D |

UE TX ProSe will interfere LTE DL in coverage

| PFF (Config 4) | | | | | | | | | | |
|---|---|---|---|---|---|---|---|---|---|---|
| | #0 | #1 | #2 | #3 | #4 | #5 | #6 | #7 | #8 | #9 |
| | D | S | U | U | D | D | D | D | D | D |

3 UL/DL out of coverage When with MasterInformationBlock-SL

TDD BASED PROSE OPTIMIZATION

This application is a 35 U.S.C. § 371 national phase filing of International Application No. PCT/SE2016/050139, filed Feb. 25, 2016, which claims the benefit of International Application No. PCT/CN2015/073314, filed Feb. 26, 2015, the disclosures of which are incorporated herein by reference in their entireties.

TECHNICAL FIELD

The present disclosure pertains to wireless communication technology, in particular to D2D or ProSe communication.

BACKGROUND

Recent developments of the 3GPP Long Term Evolution (LTE) facilitate accessing local IP based services in the home, office, public hot spot or even outdoor environments. One of the important use cases for the local IP access and local connectivity involves the direct communication between devices in the close proximity (typically less than a few 10 s of meters, but sometimes up to a few hundred meters) of each other.

This direct communication may be called D2D communication or direct mode or ProSe, communication (Proximity Service) and may enable a number of potential gains over the traditional cellular technique, because ProSe communication may involve communication over a much shorter distance between involved devices than cellular communication between devices communicating via a cellular access point (e.g., base station or eNB):

- Capacity gain: First, radio resources (e.g. OFDM resource blocks) between the ProSe and cellular layers may be reused (reuse gain). Second, a ProSe link uses a single hop between the transmitter and receiver points as opposed to the 2-hop link via a cellular AP (hop gain).
- Peak rate gain: due to the proximity and potentially favorable propagation conditions high peak rates could be achieved (proximity gain);
- Communication Latency gain: When the UEs communicate over a direct link, eNB forwarding is short cut and the end-to-end latency can decrease.

ProSe transmissions of such direct communication may use the same frame structure as the frame structure that is defined for uplink and downlink when UEs are in network coverage (in cellular communication); however, the ProSe transmissions may be restricted to a sub-set of the uplink resources in time and frequency domain. For LTE TDD system, the ProSe transmissions may be used in uplink sub-frames (as determined/used/scheduled in the context of cellular communication, e.g. by the network or network node).

It should be noted that in the following, the term ProSe (Proximity Services) communication or related terms may be used as examples for direct or D2D (Device-to-Device) communication in the context of LTE. However, this is by way of example only and generally, D2D communication or Direct Mode communication or related terms may be used instead unless specifically stated otherwise.

SUMMARY

It is an object of the present disclosure to provide approaches facilitating improved use of resources in particular for D2D/ProSe communication.

There is disclosed a method for operating a network node of a cellular communication network. The method comprises scheduling, by the network node, a ProSe Focused Frame, PFF frame. A PFF frame may facilitate improved adaption to D2D/ProSe communication requirements.

The method may further comprise configuring at least one wireless device or UE with the PFF frame, in particular by transmitting allocation data and/or RRC (Radio Resource Control) signaling like a RRC message.

Alternatively or additionally, the method may comprise assigning subframes from the PFF to a ProSe resource pool. Such assigning may generally be part of scheduling and/or configuring.

There is also considered a network node for a cellular communication network. The network node is adapted for, and/or comprises a PFF module for, scheduling a ProSe Focused Frame, PFF frame.

The network node may further be adapted for, and/or comprise a configuring module for, configuring at least one wireless device or UE with the PFF frame, in particular by transmitting allocation data and/or RRC signaling like a RRC message.

Alternatively or additionally, the network node may be adapted for, and/or comprise an assigning module for, assigning subframes from the PFF to a ProSe resource pool.

Furthermore, there is disclosed a method for operating a wireless device or UE. The method comprises the wireless device or UE performing ProSe communication based on a configuration by a network or network node, the configuration comprising an indicated ProSe Focused Frame, PFF frame.

There is also described a wireless device or UE. The wireless device or UE may be adapted for, and/or comprise a ProSe module for, performing ProSe communication based on a configuration by a network or network node, the configuration comprising an indicated PFF frame.

In addition, there is discussed a program product comprising code executable by control circuitry, the code causing the control circuitry to perform and/or control any one of the methods described herein when executed by the control circuitry.

A carrier medium arrangement is also considered, the arrangement carrying a program product as described herein and/or code executable by control circuitry, the code causing the control circuitry to perform and/or control any one of the methods described herein.

By allowing the scheduling of PFF frames, the approaches described herein allow improved D2D/ProSe communication in particular in scenarios with high D2D/ProSe traffic. A network node or wireless device adapted for PFF frames can react more flexible to D2D/ProSe traffic demands than legacy devices.

A PFF frame may be a TDD frame. It may be considered that the D2D/ProSe communication is TDD communication, in particular based on TDD scheduling and/or TDD resources. Scheduling and/or configuring may comprise scheduling and/or configuring a set of PFF frames. The set may comprise one or more than one frame. It may be considered that scheduling and/or configuring comprises scheduling a periodic set of PFF frames (scheduling a set of PFF frames such that a set is provided at constant time intervals, at least within a limited time frame covering a plurality or such time intervals).

Performing communication based on a PFF configuration may pertain to communication, in particular transmission, according to and/or based on the configuration. It may be considered that performing communication based on a PFF configuration comprises transmitting and/or receiving on a sidelink in subframes indicated for SL by the configuration. A configuration may be represented by configuration data and/or allocation data.

A PFF frame may alternatively by called D2D frame, or D2D Focused Frame, or short DFF. A wireless device may generally be a terminal or user equipment (UE).

BRIEF DESCRIPTION OF THE DRAWINGS

The drawings are provided to illustrate and elucidate concepts and approaches described herein and are not intended to limit the scope of these concepts or approaches. The drawings comprise:

FIG. 3, showing examples of transmission scenatios;

FIG. 6, schematically showing a method for operating a network node, which may be a network node as described herein;

FIG. 7, schematically showing an exemplary network node;

FIG. 8, schematically showing a method for operating a wireless device; and

DETAILED DESCRIPTION

Figure 1:
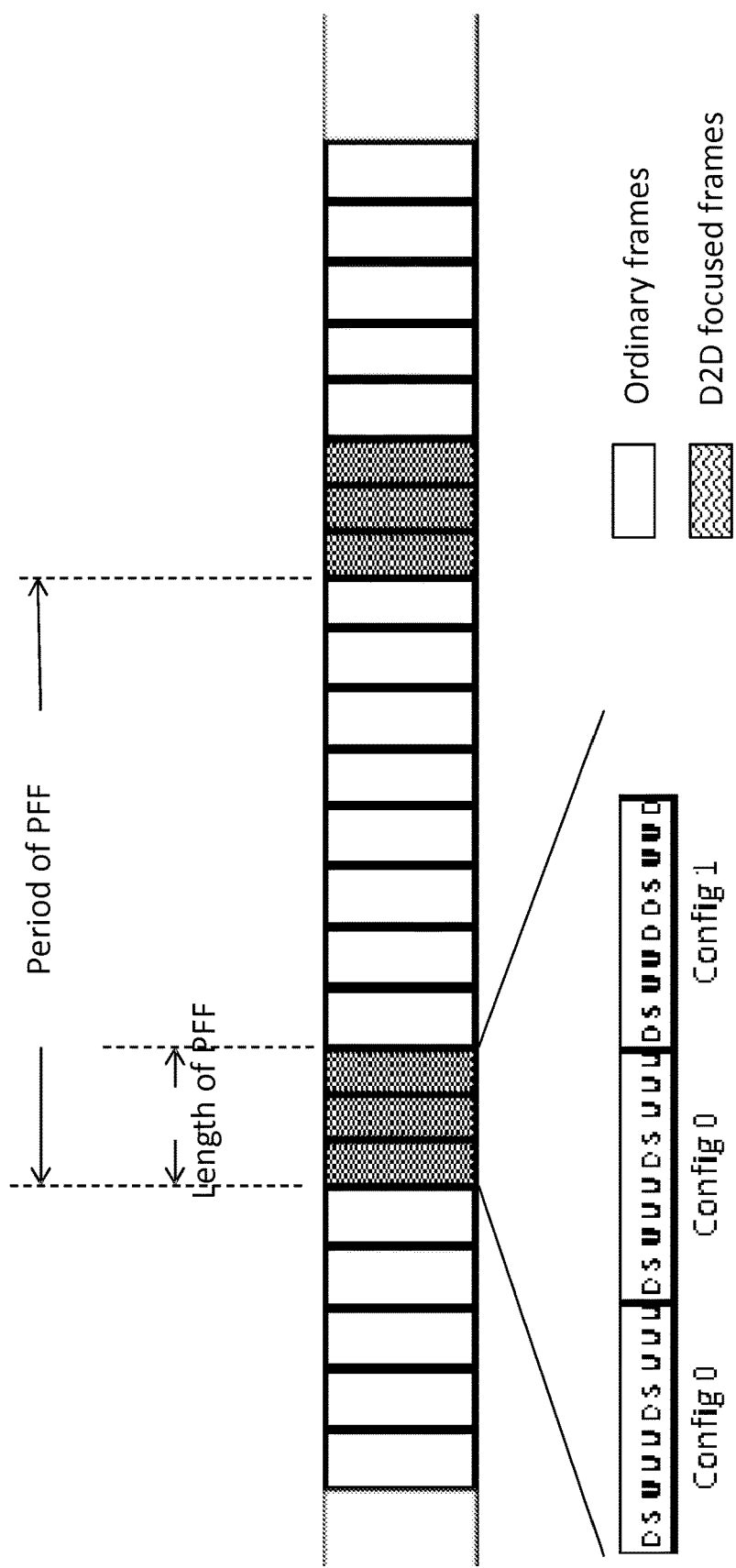
FIG. 1, showing exemplary ProSe Focused Frames.

In a LTE TDD system, the TDD UL-DL configuration may be determined according to a traffic load situation. The TDD UL-DL configuration may be semi-static configured, e.g. will not change dynamically and/or be kept over relatively long timescales in comparison to a frame duration, e.g. for more than 10 frames.

In LTE TDD system, in particular uplink sub-frames (e.g., as scheduled or determined by the network/a network node like an eNodeB) may be used for ProSe transmissions. When dimensioning a LTE TDD system to support ProSe, ProSe traffic load may be taken into account together with cellular (e.g., LTE) traffic to determine the proper TDD UL-DL configuration. Underestimation on ProSe traffic may lead to bad user experience due to insufficient resources, while overestimation may lead to resource wasting and/or negatively impact cellular communication.

Furthermore, the ProSe traffic load may be dynamically/always changing, which may cause the UL resources needed to change accordingly. To allocate UL resources for ProSe in a resource efficient manner while limiting the impact to cellular/LTE UL traffic, the TDD UL-DL configuration needs to change frequently, which is costly and difficult to implement in a practical way.

It is suggested to utilize ProSe communications as a means of relaying in cellular networks in the context of ad hoc networks. Also, the concept of allowing local ProSe communications to (re)use cellular spectrum resources simultaneously with ongoing cellular traffic is introduced.

Because non-orthogonal resource sharing between the cellular and the ProSe users/layers has the potential of reuse gain and proximity gain, at the same time increasing the resource utilization, ProSe communications underlying cellular networks are of considerable interest. Specifically, in 3GPP LTE networks, such LTE Direct (ProSe) communication can be used in commercial applications, such as cellular network offloading, proximity based social networking, or in public safety situations in which first responders need to communicate with each other and with people in the disaster area.

ProSe communication devices/entities using an LTE Direct link (which may also be referred to as sidelink) may reuse the same physical resource blocks (PRB) (=time/frequency resources) as used for cellular communications either in the downlink or in the uplink or both. The reuse of radio resources in a controlled fashion can lead to the increase of spectral efficiency, which may be at the expense of some increase of the intra-cell interference.

Typically, ProSe communicating entities (like a wireless device or UE) may use UL resources such as UL PRBs (Physical Resource Blocks, as a unit of time/frequency resources) or UL time slots, but it is possible that ProSe (LTE Direct) communications takes place in the cellular DL spectrum or in DL time slots (in addition or instead of the UL). For ease of presentation, in the present disclosure it is assumed that D2D/ProSe links or sidelinks use uplink resources, such as uplink PRBs in an FDD or uplink time slots in an a cellular TDD system, but the main ideas would carry over to cases in which ProSe communications take place in DL spectrum as well.

Both ProSe communication and ProSe direct discovery (and/or devices adapted for such operations, e.g. UEs) may operate in either one and/or both of (e.g. by switching in between) two modes for resource allocation: Scheduled resource allocation (scheduled by the cellular network or an associated device, e.g. a base station like an eNodeB) and/or UE autonomous resource selection (in which the scheduling/resource allocation may be provided by one or more UEs autonomously, e.g. without the network/base station, which may be particularly relevant for out-of coverage scenarios). For UE autonomous resource selection, a UE may autonomously select radio resource(s) from an indicated resource pool, which may be provided/indicated/determined by the network, e.g. a base station like an eNB.

The Resource pool may be determined and/or indicated using (e.g., by selecting and/or determining and/or transmitting, e.g. by the network/base station/UE providing/determining the Resource pool) suitable parameters, e.g. subframeBitmap, offsetIndicator, numPRBs, startPRB, endPRB and etc.

subframeBitmap may be used to indicate whether a subframe is with or without ProSe resources. For FDD, subframeBitmap may refer to a contiguous set of uplink subframes. For TDD, subframeBitmap may refer to contiguous uplink sub-frames of a TDD configuration. The specific parameters may be according to a specific standard, in particular LTE.

For ProSe transmissions, the same frame structure as the frame structure that is defined for uplink and downlink when UEs are in network coverage may be used; however, the ProSe transmission may be restricted to a sub-set of the uplink resources in time and/or frequency domain/s. An analogous setup may be used for the DL case, or a combination of UL/DL may be used.

A UE in an RRC CONNECTED state interested (or no longer interested) in ProSe communication/reception may be adapted to indicate and/or indicate this by sending a "ProSe interest indication", e.g. a corresponding message or signal, to the (e.g. cellular and/or LTE) network, e.g. a base station or eNB. An interest in ProSe communication may be based on operating conditions and/or the detection or discovery of at least one suitable ProSe communication partner, e.g. a ProSe enabled UE.

Two types of resource allocation for ProSe message transmission (e.g. in UL and/or DL carriers or resources) are described in more detail, e.g. for LTE: UE autonomous resource selection and Scheduled resource allocation.

UE autonomous resource selection: UE autonomously selects radio resource(s) from the indicated resource pool which is provided and/or determined and/or scheduled by the network, e.g. a network node or eNB or generally a controlling node.

Scheduled resource allocation: the RRC_CONNECTED UE requests resource(s) for ProSe transmission from the network, e.g. a network node like an eNB, and the network (e.g. the network node or eNB) configures or schedules the time/frequency resource(s) for the transmission.

A MasterInformationBlock-SL (which may be defined according to LTE standard) is transmitted by the UE transmitting SLSS (SideLink Synchronization Signals), i.e. acting as synchronization reference, via SL-BCH (SideLink Broadcast Channel), to provide some synchronization related control information to the UEs out of coverage.

The UEs out of coverage having received MasterInformationBlock-SL are supposed to transmit ProSe only during the UL subframe specified by MasterInformationBlock-SL, to avoid the interference to LTE DL traffic in coverage. A MasterInformationBlock-SL may generally be seen as a representative of an D2D reference message, which may comprise synchronization signaling and/or configuration information, which in particular may indicate a PFF configuration and/or D2D resources and/or corresponding resource pool/s. A D2D reference message may be a message broadcast (for example, on a broadcast channel and/or a SL channel), in particular by a network node like an eNodeB.

The TDD UL-DL configuration which is semi-statically configured cannot support varying ProSe traffic in resource efficient manner, which needs to adjust the TDD UL-DL configuration to reflect ProSe traffic change, which is costly and impracticable.

One method is introduced to enable varying ProSe traffic support in a resource efficient manner while limit the impact to LTE traffic.

In one example, a periodic set of frames (ProSe focused frame (PFF)) associated to the TDD configurations that are characterized by a relatively high density of UL subframes compared to other frames on the same carrier is created for mapping ProSe resources (e.g. resource pools). The configuration of these frames and the corresponding resource mapping is provided to UE and may update according to ProSe traffic load.

FIG. 3 shows examples of ProSe Focused Frames.

There is suggested creating a set of frames, in particular a periodic set of frames, (ProSe focused frame (PFF)), in particular associated to TDD configurations, that are characterized by a relatively high density of UL subframes compared to other frames on the same carrier. Since ProSe transmissions may be limited to UL subframes, the PFF frames are particularly indicated for mapping ProSe resources (e.g., ProSe pools) to them and/or may be used for scheduling a resource pool for ProSe communication. A set of frames may comprise one or more frames.

There is generally suggested a method for operating a network and/or network node. The network and/or network node may be adapted to control and/or schedule ProSe communication, in particular to schedule resource for ProSe communication, e.g. to one or more ProSe enabled and/or interested UEs. The method may comprise determining and/or scheduling a PFF frame and/or of resources within such a PFF frame, which may have more UL subframes and/or more resources dedicated or dedicatable to ProSe communication (e.g. for the one or more UEs) than other frames, in particular regular radio frames, e.g. as defined by a standard like LTE. Determining and/or scheduling such a frame may be performed periodically, e.g. with a pre-determined periodicity.

Each frame may be a frame as defined by a used standard of cellular communication, e.g. LTE, and may comprise a pre-defined number of subframes and/or slots. Resources dedicated or dedicatable to ProSe may be identified and/or determined and/or scheduled within and/or subframes.

It may be considered that a network or network node is adapted for, and/or comprises a PFF module for, such determining and/or scheduling of a PFF frame and/or of resources in such a frame. The method may comprise, and/or the network or network node may be adapted for, and/or comprise a configuring module for, configuring one or more UEs, in particular interested UEs, according to and/or with the scheduled or determined resources or PFF frame. Such configuring may comprise indicating, e.g. via corresponding signaling, a PFF frame and/or that a subframe scheduled is part of a PFF frame. Scheduling a PFF frame and/or resources within such a frame may comprise allocating and/or scheduling resources to a resource pool for ProSe communication, and/or a corresponding indicating and/or configuring.

Alternatively or additionally, there may be considered:

E1. Method for operating a network node of a cellular communication network, the method comprising scheduling a PFF frame by the network node.

E2 Method according to E1, further comprising configuring at least one UE with the PFF frame.

E3. Method according to E1 or E2, further comprising assigning subframes from the PFF to a ProSe resource pool.

E4. Network node for a cellular communication network, the network node being adapted for, and/or comprising a PFF module for, scheduling a PFF frame.

E5. Network node according to E4, the network node further being adapted for, and/or comprising a configuring module for configuring at least one UE with the PFF frame.

E6. Network node according to E4 or E5, the network node further being adapted for, and/or comprising an assigning module for, assigning subframes from the PFF to a ProSe resource pool.

E7. Method for operating a wireless device or UE, the method comprising the UE performing ProSe communication based on a configuration by a network or network node, the configuration comprising an indicated PFF frame.

E8. Wireless device or UE, the wireless device or UE being adapted for, and/or comprising a ProSe module for, performing ProSe communication based on a configuration by a network or network node, the configuration comprising an indicated PFF frame.

In one embodiment, some frames may be selected or scheduled or determined aiming to support ProSe mainly, named ProSe focused frame (PFF). PFF are associated to a TDD configuration that is not necessarily the legacy TDD configuration. The other frames are not impacted, named ordinary frames, and they use the legacy TDD configuration.

PFF may occur in time domain periodically. The periodicity of PFF occurrences may be named Period of PFF as shown in FIG. 3.

There can be several consecutive PFF during each period; the period length (the time interval between time units like frames or subframes intended/optimized for ProSe) may be variable and/or defined or scheduled by the network or network node or eNodeB.

How many PFF there are during each period is named Length of PFF as shown in FIG. 3. Other PFF configurations are possible.

The TDD configuration with high density of UL subframes is used for PFF. The TDD configuration(s) of different PFF can be same or different. A complete UL configuration may be used for a PFF. For example, a PFF may comprise 9 UL subframes (or subframes scheduled for ProSe communication, e.g. by being assigned for a ProSe resource pool), and 1 special subframe, or 10 UL or ProSe subframes. Generally, a PFF may be defined such that it comprises no DL subframes, in particular no DL subframes scheduled for traffic from the network (whereas ProSe subframes using carriers or frequency resources usually assigned for DL transmission may be considered to be in a PFF). A PFF may be defined such that a PFF comprises a pre-determined number of UL subframes and/or special subframes, but no DL subframe.

Generally, a UL subframe may be a subframe scheduling transmissions on frequency resources associated to UL transmissions in cellular communication, but may not necessary be limited to UL transmission to the network, but may be a ProSe subframe. A DL subframe may be a subframe scheduling transmissions on frequency resources associated to DL transmission in cellular communication. A ProSe subframe may generally be a subframe scheduled for ProSe transmission and/or assigned to a ProSe resource pool.

The configuration of PFF, including Period of PFF, Length of PFF and TDD configuration of PFF, may be cell specific and/or determined and/or decided by the network, e. g., a network node like an eNB.

The UL resources of PFF are mainly and/or scheduled or configured for ProSe. When ProSe traffic is not enough to take all UL resources of PFF, or when considering delay-sensitive LTE UL traffic or other constraints, some UL resources in the PFF frames can be used for LTE UL traffic.

When it configures or provides the resources for ProSe (UE autonomous resource selection and/or Scheduled resource allocation), eNB may firstly choose the UL resources from PFF. When considering delay-sensitive ProSe traffic or other constraints, the UL resources from legacy frames can be used for ProSe.

In another embodiment, the PFF configuration can be applied together with the resource pool (transmission pool, or receiving pool or both) configuration information to determine a valid ProSe resource, i.e. when consider contiguous uplink sub-frames, on which the ProSe resources will be determined according to the parameter subframeBitmap, both UL subframes in PFF and UL subframes in legacy frames need to be taken into account.

The configuration of PFF can be provided to the UE by the eNB automatically without UE querying, via dedicated signaling, e.g. RRC, or via shared signaling, e.g. via a SIB (System Information Block, which may be broadcast).

The network node or a network configuring module may be adapted for configuring only UEs with a PFF configuration (or corresponding allocation data) which have signaled or indicated interest in ProSe communication.

The eNB may provide the PFF configuration per, and/or in response to a, UE request, for example, the UE may fetch a PFF configuration from the eNB, via dedicated signaling, e.g. RRC.

Figure 2:
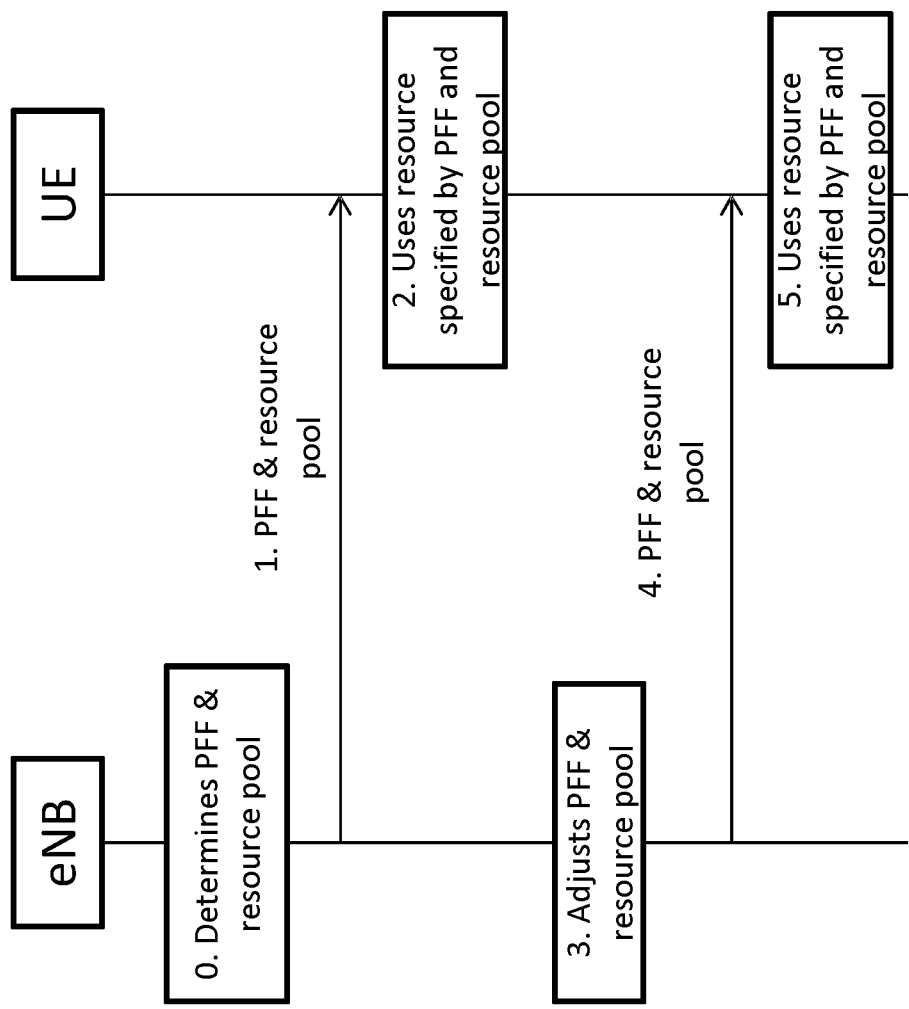
FIG. 2, showing exemplary PFF & resource pool configuration.

An exemplary overall procedure is shown in FIG. 2. The procedure may comprise:

Action 0: the eNB/network node determines the configuration of PFF and ProSe resource pools e.g., according to ProSe traffic load or demand as indicated by one or more UEs, the indication may be provided to and/or received by the eNB, e.g. via OaM (Operations and Management, higher-level network management functionality), or may be preconfigured. The resource pool refers to both transmission pool and receiving pool.

Action 1: The configuration of PFF and ProSe resource pools are provided to the UE and/or configured to one or more UEs.

Action 2: A UE performs ProSe communication, e.g. transmits/receives ProSe data using ProSe resources, in particular based on the configured resource pools.

Action 3 (optional): The network node or eNB adjusts and/or may be adapted for adjusting and/or may comprise a configuration adjusting module for adjusting the configuration of PFF and ProSe resource pools based on operation conditions, e,g. based on ProSe traffic or demand, e.g. when the ProSe traffic load or demand is changing.

Action 4: The updated/adjusted configuration of PFF and ProSe resource pools are provided and/or configured to UE/s (e.g. the network node or a configuring module may be adapted for such providing or configuring), similar to step 1.

Action 5: One or more UEs may use ProSe communication resources, e.g. transmission resources (e.g., UL resources/subframes) for ProSe communication, e.g. to transmit/receive ProSe data, similar to step 2.

Adjusting a PFF configuration (and corresponding resource pool configuration) may be performed periodically, in particular steps 3-5 may occur periodically.

When the eNB provides the information of the receiving resource pools of its neighboring cell (to enable the UE to receive ProSe from the UEs in neighboring cell), the eNB may provide the corresponding PFF configuration of the corresponding cell together with the pool information. The PFF configuration information of the neighboring cells can be obtained via, e.g. X2 interface.

When the UE is transmitting MasterInformationBlock-SL, the PFF configuration can be included in MasterInformationBlock-SL and transmitted, so that the UEs receiving a MasterInformationBlock-SL can know all the information of UL subframes.

Referring to FIG. 3, some cases may be observed (e.g. by the UE):

Case 1: the real UL/DL configuration (e.g., as provided by the network/network node) of the cell in coverage.

Case 2: the interpretation of the UE out of coverage, when MasterInformationBlock-SL is not supported or MasterInformationBlock-SL does not include PFF configuration. In case 2, the UE out of coverage may consider the subframe (marked with the arrow) as UL, and may transmit ProSe, which will lead to interference to LTE DL in coverage. The reason is that a DL subframe in PFF is considered as UL by mistake by the UE out of coverage without having the PFF configuration information.

Case 3: the interpretation of the UE out of coverage, when MasterInformationBlock-SL includes PFF configuration. There is no problem.

In FIG. 3, Config 2 corresponds to a legacy configuration of a frame, Config 4 corresponds to a PFF configuration.

With ProSe focused frames introduced, it is possible to support varying ProSe traffic in a resource efficient manner in LTE TDD system while limit the impact to LTE traffic.

Configuring a resource pool may include determining and/or allocating and/or defining resources for the pool, e.g. by a controlling node.

Generally, the resources of a ProSe resource pool may be used by an UE (or more than one UE) for ProSe communication and/or may indicate resources allowable for ProSe communication, in particular transmissions.

A network node and/or eNodeB and/or controlling node or configuring module may be adapted to configure more than one ProSe resource pool. Configuring may be performed accordingly.

Configuring or indicating a resource pool may comprise providing, e.g. transmitting, information pertaining to the resource pool. Information pertaining to a resource pool generally may comprise information indicating the resources comprised in the resource pool and/or the resources the resource pool consists of. The resource of a resource pool may generally be radio resources, in particular time/frequency resources.

Providing and/or transmitting, information pertaining to a resource pool may comprise broadcasting and/or dedicated transmission, e.g. to one or more specific targets, which may be UEs and/or a network node, e.g. a network node which is not a controlling node, but used for transmitting the resource pool to UEs.

Alternatively or additionally, such targets may be targets that have indicated and/or are adapted to indicate to a network node indicating a resource pool that the pool pertains to them, e.g. by transmitting information indicating that they are ProSe-enabled and/or are signing up for discovery, e.g. discovery of Model B, and/or are adapted with discoverer and/or discoveree capability. A UE having discoverer capability may be adapted to transmit a discovery request (message) and/or to receive a discovery response (message), and/or may be referred to as discoverer UE. A UE having discoveree capability may be adapted to receive a discovery request (message) and/or to transmit, in response to the request (message), a discovery response (message), and/or may be referred to as discoveree UE. A UE may generally be adapted as discoverer UE and discoveree UE and/or switch between corresponding functionalities.

A resource pool may be indicated according to an allocation of resources, which may be represented by a resource pool itself (e.g. an internal pool of a network node like a controlling node or eNodeB). Specific and/or dedicated pools may be indicated to specific targets. For example, a discovery request transmitting pool and/or a discovery response receiving pool may be indicated to one or more discoverer UEs. Alternatively or additionally, a discovery request receiving pool and/or a discovery response transmitting pool may be § indicated to one or more discoveree UEs. In case a UE is both discoverer and discoveree, it may be target for a combination of such pools.

Obtaining information, e.g. by a UE and/or an information obtaining module, in particular information indicating a resource pool, may comprise receiving such information, e.g. from a transmission, e.g. from a network or network node, and/or reading it from a memory, e.g. a memory of control circuitry of a UE, and/or determining based on pre-determined information and/or from history; the latter of which may comprise reading from a memory as well. Obtaining information indicating a resource pool may include combining information indicating different other pools, in particular for a receiving pool.

Generally, a (resource) pool may include and/or indicate resources for communication, e.g. cellular and/or ProSe/D2D communication. A discovery pool may indicate resources allocated for discovery. Resources in or indicate by a pool may be generally available to different UEs and/or non-UE specific (when allocating resources to the pool). A network node (e.g. an eNB) may be adapted to allocate resources to one or more than one pools. The network node may comprise a pool allocating module for allocating resources to a pool. Monitoring a resource pool may refer to monitoring resources (time/frequency resources) included in or indicated by the pool, e.g. listening for transmission on the corresponding resources. A network node (e.g. eNB) and/or a pool transmitting module of the network node may be adapted to transmit pool information or pool data pertaining to the pool (e.g. indicating the resources of or in the pool), e.g. via broadcast and/or multicast and/or to a pre-defined list of UEs. The node transmitting the pool information or data may be adapted to receive, and/or receive and/or comprise a receiving module for receiving, corresponding data from another node of a network and/or a UE, which may be adapted to allocate and/or schedule resources to a resource pool and/or to define a resource pool.

A program product comprising code executable by control circuitry is described, the code causing the control circuitry to perform and/or control any one method disclosed herein when executed by the control circuitry, in particular a method for operating a UE or a network node, in particular if running on control circuitry of the UE or the network node.

There is also disclosed a carrier medium arrangement carrying a program product as described herein and/or code executable by control circuitry, the code causing the control circuitry to perform and/or control any one method disclosed herein. A carrier medium arrangement may comprise at least one carrier medium. The program product may be distributed over more than one carriers, so that e.g. different parts of the program product are stored or carried on different media.

There may generally be considered a UE or wireless device adapted for carrying out any of the methods for operating a wireless device described herein. A network node adapted for carrying out any of the methods for operating a network node described herein may be envisaged. A network node may be implemented as an eNodeB, in particular according to LTE. The network node may be adapted for, and/or comprise a receiving module for, receiving a report from a wireless device, and/or to relay the report to higher layers of the network and/or an operator billing service.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc. In the following UE or user equipment may be used as an example for or interchangeably with wireless device. eNode or base station may be used as an example for or interchangeably with network node.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services.

Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device or ProSe communication may optionally include broadcast and/or multicast communication to a plurality of devices or nodes.

A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for wireless device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled.

It may be considered that a user equipment or wireless device comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node.

Generally, a network node or base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

ProSe or Device-to-device (D2D) communication or operation may generally refer to communication between nodes or wireless devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device or ProSe communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments.

D2D communication may be communication between two wireless devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A device configured for and/or capable of device-to-device communication, which may be called wireless device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting resources allocated by the controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE.

In the context of this description, a user equipment or wireless device generally may be a device capable of D2D communication and/or operation, in particular using frequencies and/or resources of a cellular and/or licensed communication system, e.g. a system according to a LTE standard, and may be also referred to as D2D enabled or capable UE or node. A wireless device may comprise any entity or equipment or device or node capable of at least receiving and/or transmitting radio signals on a direct radio link, i.e., between the entity and another D2D capable entity or wireless device. A wireless device or wireless device may for example be comprised in or comprise a cellular UE, PDA, a wireless device, laptop, mobile, sensor, relay, D2D relay, a small base station employing a UE-like interface, etc. Any device or entity capable to support and/or perform at least one D2D operation may be considered a wireless device; a wireless device may be adapted to support and/or perform at least one D2D operation. A wireless device may generally be adapted for cellular operation and/or communication in a wireless communication network. It may be considered that a wireless device generally comprises radio circuitry and/or control circuitry for wireless communication, in particular D2D operation or communication and cellular operation or communication. A wireless device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

ProSe or D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a wireless device or UE. A D2D receive operation may comprise receiving, by a wireless device or UE, of D2D data and/or signals. A D2D transmit operation may comprise, transmitting, by a wireless device or UE, of D2D data and/or signals. A wireless device performing at least one ProSE/D2D operation may be considered to be in D2D or D2D mode or in D2D operation. D2D operation may comprise D2D measurements. A user equipment adapted to perform at least one type of ProSe/D2D operation may be considered to be ProSe/D2D-enabled.

Cellular operation (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a wireless device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another wireless device. A D2D transmission may be a unicast, groupcast, or broadcast transmission. A D2D transmission may be on the uplink time-frequency resources of a wireless communication system. Transmission and/or reception and/or communication may generally be radio-based.

A network node may be a controlling node connected or connectable to a UE for cellular and/or D2D communication. A controlling node may be defined by its functionality of configuring the UE device, in particular in regards to measuring and/or reporting data pertaining to D2D operation, and/or for defining and/or allocating and/or configuring one or more than one resource pools, in particular resource pools for ProSe operation and/or ProSe discovery. A controlling node may be a network node that is adapted to schedule, decide and/or select and/or allocate, at least in part, time-frequency resources to be used for at least one of: cellular communication or transmissions and D2D communication or transmissions. The controlling node may also provide scheduling information to another node, such as another wireless device, a cluster head, a radio network node such as eNodeB, or a network node (e.g. a core network node), MME, positioning node, D2D server, RNC, SON, etc). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement arranged to be executable by a hardware device, e.g. control circuitry, and/or storable in a memory, which may provide D2D functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may generally be a radio network node (which may be adapted for wireless or radio communication, e.g. with a wireless device or a UE) or another network node, e.g. an eNodeB. A network node generally may be a controlling or allocating node; an eNodeB defining and/or configuring one or more resource pools may be seen as controlling or allocating node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device may generally be a node or device adapted to perform D2D communication, in particular transmission and/or reception, and/or at least one type of D2D operations. In particular, a wireless device may be a terminal and/or user equipment and/or D2D enabled machine and/or sensor. The wireless device may be adapted to transmit and/or receive D2D data based on allocation data, in particular on and/or utilizing resources indicate in the allocation data. D2D communication and/or transmission by a wireless device may generally be in UL resources and/or corresponding carrier or frequency and/or modulation. A wireless device (such as a UE) may be adapted for and/or capable of CA or CA operation. In particular, it may be adapted to transmit and/or receive one or more than one CCs and/or utilising, and/or participating in, carrier aggregation. A wireless device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data. Configuration data may be received, by the wireless device, from another node or wireless device, in particular a network node.

A network node may generally be adapted to provide and/or determine and/or transmit configuration data, in particular to a wireless device. Configuration data may be considered to be a form of allocation data and/or may be provided in the form of a message and/or data packet/s.

Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Configuring a, or by a, wireless device may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one ProSe enabled devices. A wireless device may be adapted for configuring itself, e.g. based on configuration and/or allocation data, which it may receive from a network or network node.

Each or any one of the wireless devices or user equipments described or shown may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations described or shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Figure 4:
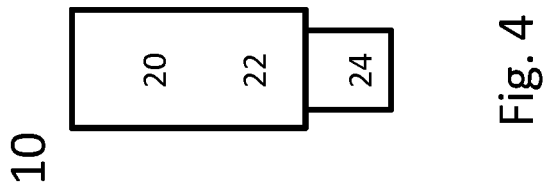
FIG. 4, schematically showing an exemplary user equipment.

FIG. 4 schematically shows a wireless device or user equipment 10. User equipment 10 comprises control circuitry 20, which may comprise a controller connected to a memory. Any module of a user equipment may implemented in and/or executable by, user equipment, in particular the control circuitry 20. User equipment 10 also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for cellular communication with a network on a first cell/carrier and a second cell/carrier and/or for dual connectivity, in particular utilizing E-UTRAN/LTE resources as described herein. The user equipment 10 may be adapted to carry out any of the methods for operating a wireless device or UE disclosed herein; in particular, it may comprise corresponding circuitry, e.g. control circuitry.

Figure 5:
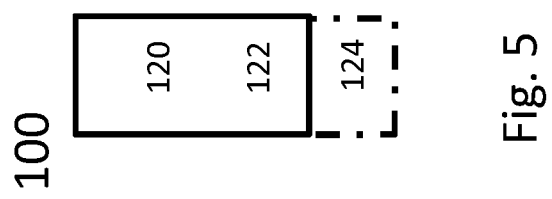
FIG. 5, schematically showing an exemplary network node.

FIG. 5 schematically show a network node or base station 100, which in particular may be an eNodeB. Network node 100 comprises control circuitry 120, which may comprise a controller connected to a memory. Any module of a network node, e.g. a receiving module and/or transmitting module and/or control or processing module and/or scheduling module, may be implemented in and/or executable by the network node, in particular the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. It may be considered that the network node 100 is adapted for scheduling and/or configuring PFF frames and/or ProSe resource pools.

FIG. 6 schematically shows a method for operating a network node, which may be a network node as described herein. The method comprises an action NS10 of scheduling a ProSe Focused Frame, PFF frame.

FIG. 7 schematically shows a network node. The network node comprises a scheduling module NM10 for performing action NS10.

Figure 8:
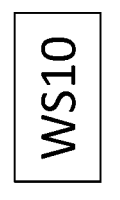

FIG. 8 schematically shows a method for operating a wireless device, which may be a wireless device as described herein. The method comprises an action WS10 of performing ProSe or D2D communication based on a configuration by a network or network node, the configuration comprising an indicated ProSe Focused Frame, PFF frame.

Figure 9:
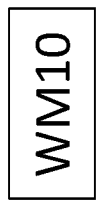
FIG. 9, schematically showing a wireless device.

FIG. 9 schematically shows a wireless device. The wireless device may comprise a.ProSe (or D2D) module WM10 for performing action WS10.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Some abbreviations used are:
3GPP $3^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems PC Power Control
PDCCH Physical DL Control CHannel
PH Power Headroom
PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SIB System Information Block
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to the LTE standard, where appropriate.

The invention claimed is:

1. A method for operating a network node of a cellular communication network, the method comprising:
scheduling, by the network node, a plurality of frames in a time division duplexing, TDD, communication protocol utilized in a cell of the cellular communication network served by the network node, each of the plurality of frames comprising a first plurality of uplink subframes and a first plurality of downlink subframes; and
scheduling, by the network node, a periodically repeating proximity service, ProSe, Focused Frame, PFF frame, among the plurality of frames, wherein the periodically repeating PFF frame comprises a second plurality of uplink subframes that is greater than the first plurality of uplink subframes.

2. The method according to claim 1, further comprising configuring at least one wireless device with the PFF frame.

3. The method according to claim 1, further comprising assigning uplink subframes from the PFF to a ProSe resource pool for use by a first wireless device in the cell for transmitting and/or receiving ProSe communications to/from another wireless device.

4. A network node for a cellular communication network, the network node being adapted for:
scheduling a plurality of frames in a time division duplexing, TDD, communication protocol utilized in a cell of the cellular communication network served by the network node, each of the plurality of frames comprising a first plurality of uplink subframes and a first plurality of downlink subframes; and
scheduling a periodically repeating proximity service, ProSe, Focused Frame, PFF frame, among the plurality of frames, wherein the periodically repeating PFF frame comprises a second plurality of uplink subframes that is greater than the first plurality of uplink subframes.

5. The network node according to claim 4, the network node further being adapted for configuring at least one wireless device with the PFF frame.

6. The network node according to claim 4, the network node further being adapted for assigning uplink subframes from the PFF to a ProSe resource pool for use by a first wireless device in the cell for transmitting and/or receiving ProSe communications to/from another wireless device.

7. A method for operating a wireless device, the method comprising:
receiving a resource allocation from a network node serving the wireless device, the resource allocation scheduling a plurality of frames in a time division duplexing, TDD, communication protocol, each of the plurality of frames comprising a first plurality of uplink subframes and a first plurality of downlink subframes, and scheduling a periodically repeating proximity service, ProSe, Focused Frame, PFF frame, among the plurality of frames, wherein the periodically repeating PFF frame comprises a second plurality of uplink subframes that is greater than the first plurality of uplink subframes; and
performing ProSe communication within the PFF frame based on the resource allocation.

8. A wireless device, the wireless device being adapted for:
receiving a resource allocation from a network node serving the wireless device, the resource allocation scheduling a plurality of frames in a time division duplexing, TDD, communication protocol, each of the plurality of frames comprising a first plurality of uplink subframes and a first plurality of downlink subframes, and scheduling a periodically repeating proximity service, ProSe, Focused Frame, PFF frame, among the plurality of frames, wherein the periodically repeating PFF frame comprises a second plurality of uplink subframes that is greater than the first plurality of uplink subframes; and
performing ProSe communication within the PFF frame based on the resource allocation.

9. The method of claim 1, wherein the PFF frame is devoid of downlink subframes.

10. The network node of claim 4, wherein the PFF frame is devoid of downlink subframes.

11. The method of claim 7, further comprising transmitting a PFF configuration including PFF scheduling information on a sidelink broadcast channel to a wireless terminal that is outside a coverage area of the network node.

12. The wireless device of claim 8, wherein the wireless device is further adapted for transmitting a PFF configuration including PFF scheduling information on a sidelink broadcast channel to a wireless terminal that is outside a coverage area of the network node.

* * * * *